No. 875,358.

PATENTED DEC. 31, 1907.

J. E. LANDRY.
COMBINED BRAKE AND STEERING KNUCKLE.
APPLICATION FILED OCT. 18, 1907.

Witnesses
L. E. Allen
Joseph T. Brennan

Inventor
Joseph E. Landry
By His Attorney
Everett E. Kent

UNITED STATES PATENT OFFICE.

JOSEPH EUCLIDE LANDRY, OF NEW BEDFORD, MASSACHUSETTS.

COMBINED BRAKE AND STEERING-KNUCKLE.

No. 875,358.  Specification of Letters Patent.  Patented Dec. 31, 1907.

Application filed October 18, 1907. Serial No. 398,101.

*To all whom it may concern:*

Be it known that I, JOSEPH EUCLIDE LANDRY, of New Bedford, in the county of Bristol and State of Massachusetts, have invented certain new and useful Improvements in a Combined Brake and Steering-Knuckle, of which the following is a specification.

This invention relates to improvements in combined brakes and steering knuckles for self-propelled vehicles.

More particularly it relates to means for strengthening the steering-knuckle, increasing the braking power, and disposing it more effectively and economically than heretofore.

The invention also constitutes a safety device to prevent the overturning of a car.

Figure 1:
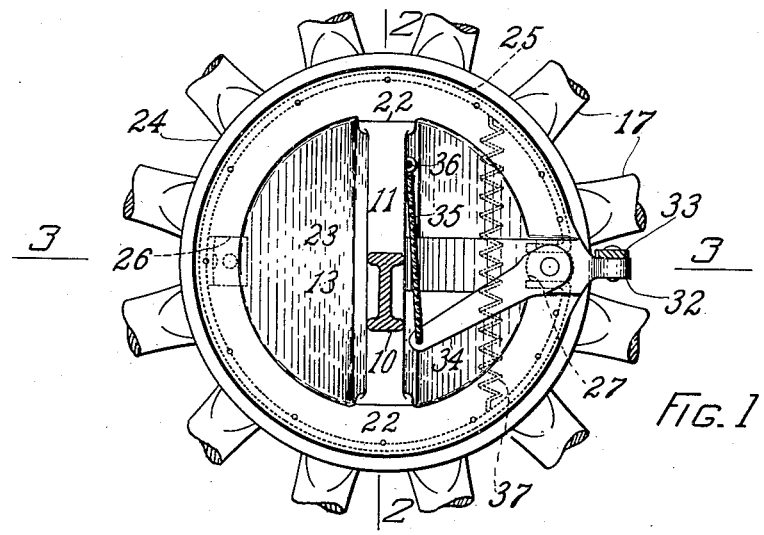
Figure 2:
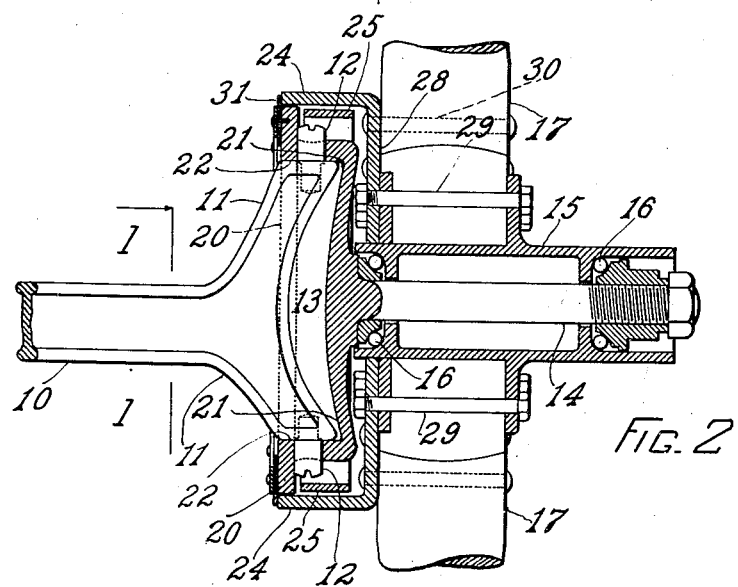
Figure 3:
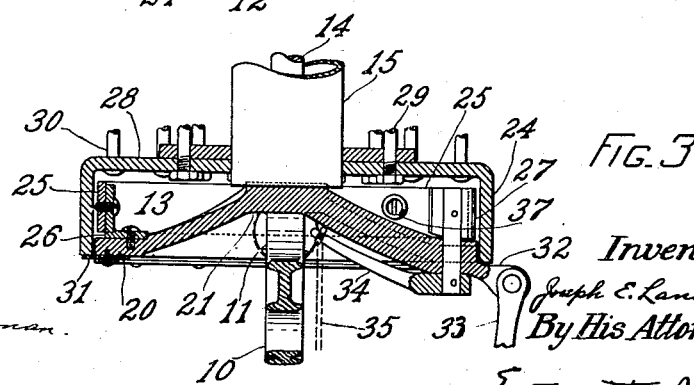

The object of the invention is to improve the connection between the axle-beam and the steering wheel; to apply the brakes to the forward or steering wheels, and to combine them with the improved knuckle connection; to provide effectively for maintaining the brake always in working order; and to embody these improvements in a device which may readily be applied to existing cars as well as to new construction. These objects are accomplished by the apparatus hereinafter described, reference being had to the accompanying drawings, in which, Figure 1 represents apparatus embodying the invention viewed in end elevation as from the line 1—1 of Fig. 2, with the dust guard ring removed. Fig. 2 represents the same apparatus in side elevation, sectioned on the line 2—2 of Fig. 1. Fig. 3 represents the same in plan view, sectioned on the line 3—3 of Fig. 1.

Referring to the drawings, 10 represents the axle-beam of a vehicle, here shown as an I-beam although it may be of any desired type, having a forked end 11, which forms one member of the steering knuckle.

The journals of the knuckles are represented somewhat diagrammatically by pins 12. The other member of the knuckle is a dished disk 13, carrying the axle 14. The axle box is marked 15, the bearings between the axle box and the axle 16, and the spokes of the wheel 17. These latter parts may be of any suitable type; but the knuckle member 13 constitutes one feature of the invention. This is a disk perpendicular to the axle, having its central part recessed from the plane of its face 20 to the position 21, as clearly shown in Fig. 3, where the horizontal dimension of this recessed portion is seen; and in Fig. 2 where its vertical dimension is seen. This recess provides a horizontal bearing surface 22 for the knuckle joints. The connection between these bearings and the axle is circular-braced, as appears more definitely in Figs. 3 and 1, both by the flange or unrecessed portion 20 of the disk and by the web 23 which fills the space between the portion 20 and the portion 21.

A brake band 25 is mounted between the disk 13 and another dished disk 24, 28, fast to the wheel, and having a flange or drum projecting over and inclosing the disk 13. This band is anchored to the disk as at 26, and is expansible by means of a cam pin 27 in a well-known manner. When expanded it bears against the interior of the drum and retards its revolution, thus retarding revolution of the wheel.

The wheel member of the brake may be a part of the axle box, or may, as represented, be a separate piece fastened to the box by bolts 29, and fastened to the spokes by bolts 30. As these bolts 30 may be at considerably greater radial distance from the axis than the axle box, they afford a secure means for communicating to the wheel the drag of the brake. The axle-beam side of the brake disk or drum 24 is closed by the knuckle disk 13 and its face 20. The clearance between these parts is exaggerated in the drawings for the sake of clearness; and a felt washer 31 is shown covering this space.

A lug 32 and a lever 33 attached thereto are provided, as usual, whereby the steersman may turn the wheel member of the knuckle for steering the vehicle. The cam 27 for operating the brake is provided with a control lever 34, which may be pulled by the operator to apply the brake, by any suitable means, a cord 35 passing through eye 36 on the axle-beam being here represented for that purpose. When the pull is released, spring 37 causes the brake band to contract out of contact with drum surface 24. It will be understood that the invention is not limited to the particular type of brake here delineated, and that other variations may be made from the design here shown, which is largely diagrammatical in character.

So far as I am aware no practicable and economical method of applying brakes to the front wheels of an automobile car has heretofore been known. The steering knuckle has always been a weak point, liable to fracture when the car sustains a severe shock. The combined circular and endwise bracing here shown, consisting of a dished disk, eliminates that weakness. The application of the brake to the front wheels prevents skidding of the rear wheels which not infrequently happens when the brake is applied on the rear axle, and thus prevents the damage and overturns of the car resulting from such skidding. The application of the brake to the front wheels places it where the weight of the car is greater, and therefore increases the braking power, particularly on descending grades. It also puts the brake where dust and flying gravel are at a minimum; and the working parts of the invention, viz., the two dished disks, efficiently exclude foreign matter which might interfere with the proper working of the brakes, without the necessity of providing any special protection.

I claim:

1. In combination, an axle-beam, an axle, and a knuckle joining them, the axle member of the knuckle being a disk journaled to the beam on a vertical axis.

2. In combination, an axle-beam, an axle, and a knuckle joining them, the axle member of the knuckle being a dished disk, and the beam end being journaled vertically in the dished portion.

3. In combination, an axle-beam, an axle, and a knuckle joining them, the axle member of the knuckle being a disk having a circular flange portion projecting outside the journals of the knuckle and set perpendicular to the axle.

4. In combination, an axle-beam, an axle, and a knuckle joining them, two dished disks, and a brake band intervening anchored to one and adapted to bear against the other, one of said disks being fast on the wheel, and the other fast on the axle and constituting the axle member of the knuckle.

5. In combination, an axle-beam, an axle, and a knuckle joining them; the axle member of the knuckle being circular braced around the axis of the axle, and having its center dished from the plane of its outer parts.

6. In combination, an axle-beam, an axle, and a knuckle joining them, the axle member of the knuckle being a disk set on the vehicle side of the wheel, and dished toward the wheel, there being around the disk a brake band and a bearing therefor, one of these being on the disk and the other on the wheel.

In testimony whereof I hereto affix my signature, in presence of two witnesses.

JOSEPH EUCLIDE LANDRY.

Witnesses:
EVERETT E. KENT,
G. D. DODGE.